United States Patent
Hwang

(10) Patent No.: US 9,924,561 B2
(45) Date of Patent: Mar. 20, 2018

(54) METHOD AND SYSTEM FOR TRANSMITTING SENSOR SIGNALS

(71) Applicant: HANWHA TECHWIN CO., LTD., Changwon-si (KR)

(72) Inventor: Kwanggeun Hwang, Changwon-si (KR)

(73) Assignee: Hanwha Power Systems Co., Ltd., Changwon-si (KR)

(*) Notice: Subject to any disclaimer, the term of this patent is extended or adjusted under 35 U.S.C. 154(b) by 260 days.

(21) Appl. No.: 14/718,495

(22) Filed: May 21, 2015

(65) Prior Publication Data

US 2016/0143088 A1    May 19, 2016

(30) Foreign Application Priority Data

Nov. 17, 2014    (KR) ........................ 10-2014-0160056

(51) Int. Cl.
| | |
|---|---|
| *H04W 84/18* | (2009.01) |
| *H04W 4/00* | (2009.01) |
| *H02J 5/00* | (2016.01) |
| *H02J 50/20* | (2016.01) |
| *H02J 50/00* | (2016.01) |
| *F04D 27/00* | (2006.01) |
| *F01D 21/00* | (2006.01) |

(52) U.S. Cl.
CPC .......... *H04W 84/18* (2013.01); *F01D 21/003* (2013.01); *F04D 27/001* (2013.01); *H02J 5/005* (2013.01); *H02J 50/00* (2016.02); *H02J 50/20* (2016.02); *H04W 4/005* (2013.01); *F05D 2270/80* (2013.01)

(58) Field of Classification Search
CPC .............................. H04W 4/005; H04W 84/18
See application file for complete search history.

(56) References Cited

U.S. PATENT DOCUMENTS

| | | | |
|---|---|---|---|
| 2012/0049620 A1 | 3/2012 | Jansen | |
| 2014/0077964 A1* | 3/2014 | Beligere | ................ E21B 47/06 340/853.3 |
| 2014/0200702 A1* | 7/2014 | Liu | ........................ G01N 29/14 700/112 |
| 2014/0260293 A1* | 9/2014 | Chen | ........................ F02C 9/00 60/773 |
| 2015/0139198 A1* | 5/2015 | Hwang | ............. H04W 52/0203 370/336 |

FOREIGN PATENT DOCUMENTS

| | | |
|---|---|---|
| KR | 1020090093543 A | 9/2009 |
| KR | 1020120007296 A | 1/2012 |
| KR | 1020130067907 A | 6/2013 |
| KR | 1020130132214 A | 12/2013 |

\* cited by examiner

*Primary Examiner* — Ashley Shivers
(74) *Attorney, Agent, or Firm* — Sughrue Mion, PLLC

(57) ABSTRACT

A sensor signal transmission system includes: at least one wireless sensor disposed in an equipment package and configured to sense at least one type of information; a gateway configured to receive the at least one type of information sensed by the at least one wireless sensor in a wireless manner, and convert the received information into at least one communication signal; a controller configured to control the equipment package by collecting the at least one communication signal input from the gateway; and at least one wireless power supply configured to supply power to the at least one wireless sensor in a wireless manner.

11 Claims, 5 Drawing Sheets

METHOD AND SYSTEM FOR TRANSMITTING SENSOR SIGNALS

CROSS-REFERENCE TO THE RELATED APPLICATION

This application claims priority from Korean Patent Application No. 10-2014-0160056, filed on Nov. 17, 2014, in the Korean Intellectual Property Office, the disclosure of which is incorporated herein in its entirety by reference.

BACKGROUND

1. Field

Apparatuses and methods consistent with exemplary embodiments relate to a sensor signal transmission system using a wireless sensor network system and wireless power.

2. Description of the Related Art

It is difficult to individually wire gas turbines, compressors, etc. in which a large number of sensors are installed in a narrow space.

SUMMARY

One or more exemplary embodiments include a method and system for transmitting sensor signals by using wireless sensors, which are capable of solving a wiring problem of a package equipment in which a large number of sensors are installed in a narrow space, and supplying power in a wireless manner to stably control the sensors.

Additional aspects will be set forth in part in the description which follows and, in part, will be apparent from the description, or may be learned by practice of the presented embodiments.

According to one or more exemplary embodiments, there is provide a sensor signal transmission system which may include: at least one wireless sensor disposed in an equipment package and configured to sense at least one type of information; a gateway configured to receive the at least one type of information sensed by the at least one wireless sensor in a wireless manner, and convert the received information into at least one communication signal; a controller configured to control the equipment package by collecting the at least one communication signal input from the gateway; and at least one wireless power supply configured to supply power to the at least one wireless sensor in a wireless manner.

The sensor signal transmission system may use a wireless sensor network system and wireless power.

According to one or more exemplary embodiments, there is provided a method of transmitting a sensor signal from an equipment package in which at least one wireless sensor is installed in a narrow space. The method may include: controlling at least one wireless sensor attached to at least one device, respectively, included in the equipment package to sense at least one type of information, and transmitting the sensed information to a gateway in a wireless manner; controlling the gateway to transform the sensed information into at least one communication signal; further controlling the at least one wireless sensor based on the at least one communication signal; and controlling at least one wireless power supply to supply power to the at least one wireless sensor in a wireless manner.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Figure 1:
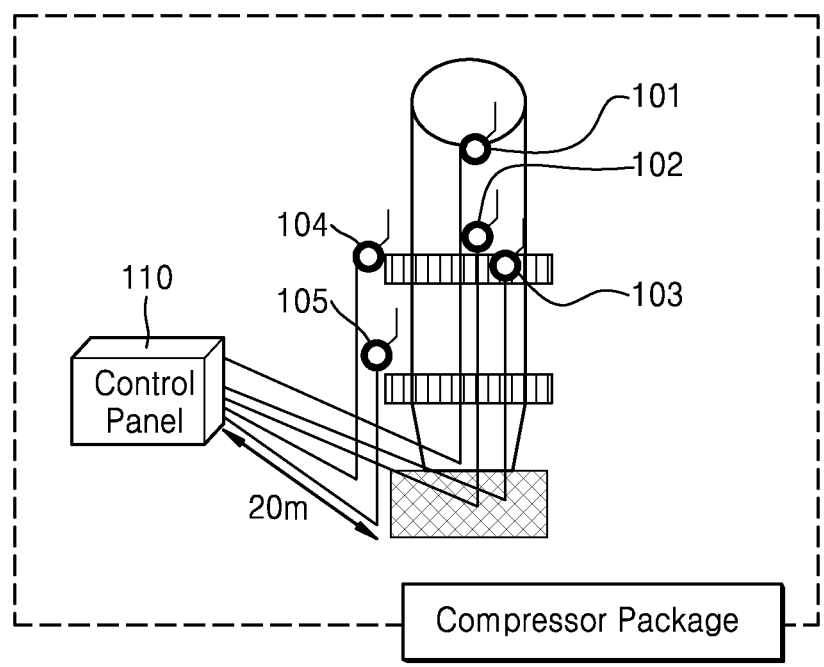
FIG. 1 is a diagram of a sensor signal transmission system in which sensors are installed in a compressor by using wires, according to an exemplary embodiment.

Reference will now be made in detail to exemplary embodiments, which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description.

FIG. 1 is a diagram illustrating a sensor signal transmission system, according to an exemplary embodiment. The sensor signal transmission system according to an exemplary embodiment includes sensors 101 to 105 which are installed in a compressor by using wires.

The sensors 101 to 105 installed in the compressor are connected to a controller 110 via wires, respectively. The controller 110 is embodied to perform both a function of a control panel (junction box) and a function of a control valve that controls the sensors 101 to 105 or equipment in which the sensors 101 to 105 are installed.

In this case, various materials such as cables, cable protection pipes, trays, a cable tray, etc. are required to wire the sensors 101 to 105.

Also, many efforts should be exerted to maintain and repair wires while considering a space for maintaining and repairing various types of equipment installed in a compressor. In particular, in order to prevent water from being collected on wires due to a temperature difference between day and night and a moisture difference between seasons, a vent and a drain should be installed at a top point and a bottom point, respectively, on a place the wires are installed. However, it is very likely that a vent and a drain are difficult to install when sensors are disposed densely.

In addition, when wires are maintained and repaired, e.g., when aging wires are exchanged, all components related to the wires, e.g., pipes, trays, etc., should be dissembled and then newly wired, thereby causing installation inconvenience. When new sensors are added at a later time, not only a space to be occupied by the new sensors but also wires for installing the new sensors and a wire routing space are needed.

Figure 2:
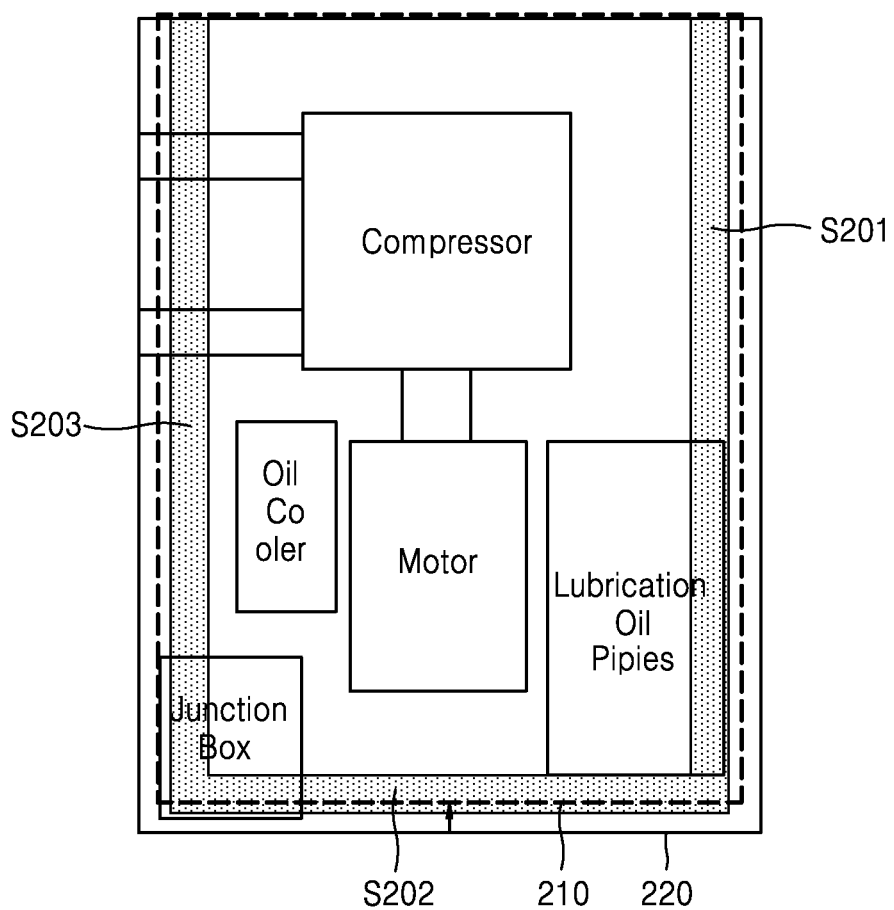
FIG. 2 illustrates a sensor signal transmission system using wires, according to an exemplary embodiment.

FIG. 2 illustrates a sensor signal transmission system 220 using wires, according to an exemplary embodiment. In the sensor signal transmission system 220 using wires, a space in which cable trays S201, S202, and S203 are to be installed for wiring components is needed as illustrated in FIG. 2.

However, the size of the sensor signal transmission system 220 may exceed a predetermined size of a container box 210 for carrying the sensor signal transmission system 220 due to the space in which the cable trays S201, S202, and S203 are to be installed.

In this case, a container box larger by one size than the size of the sensor signal transmission system 220 should be used or the sensor signal transmission system 220 should be disassembled, supplied, and assembled again on site, thereby causing user inconvenience.

Figure 3:
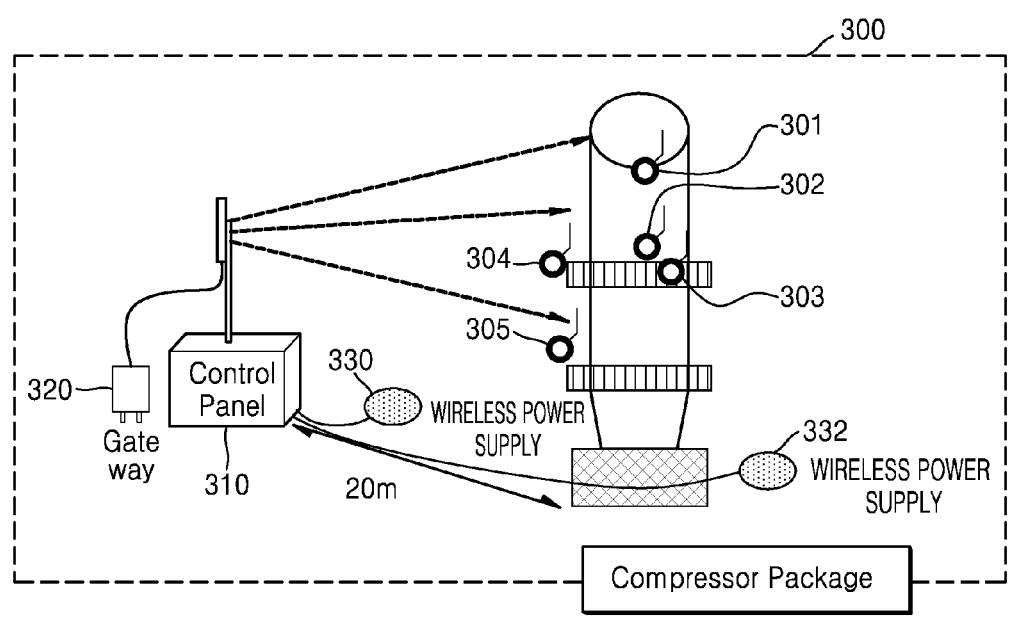
FIG. 3 illustrates a sensor signal transmission system using a wireless sensor network system and wireless power, according to an exemplary embodiment.

FIG. 3 illustrates a sensor signal transmission system 300 using a wireless sensor network system and wireless power, according to an exemplary embodiment.

According to an exemplary embodiment, the sensor signal transmission system 300 includes wireless sensors 301, 302, 303, 304, and 305, a controller 310, a gateway 320, and a wireless power supplies 330 and 332 that are installed in an equipment package.

According to an exemplary embodiment, the sensor signal transmission system 300 is configured based on a wireless sensor network system. A wireless sensor network should be understood as a small-sized wireless transceiver apparatus network system in which information collected via sensors is processed and transmitted using a processor.

The wireless sensor network includes the wireless sensors 301, 302, 303, 304, and 305 each having a sensing capability, an information processing capability of processing sensed information, and a wireless communication capability, and the gateway 320 that collects information from the wireless sensors 301, 302, 303, 304, and 305 and transforms the information into a communication signal.

The wireless sensors 301, 302, 303, 304, and 305 are attached to a device included in the equipment package so as to sense ambient temperature and moisture, and context information of the device in real time. Here, the context information should be understood as information that defines the features of a situation related to ubiquitous computing, such as a person, a place, an object, a unity, time, etc. that affects an interaction between a user and another user, a system, or an application of a device. The context information specifies a computing context (such as a network connection state, a communication bandwidth, a printer, a display, a workstation, etc.), a user context (such as the profile and location of the user, neighboring people, etc.), a physical context (such as brightness, a noise level, a transportation state, temperature, etc.), a time context (such time, a week, a month, a season, etc.), etc.

The wireless sensors 301, 302, 303, 304, and 305 include a temperature sensor, a pressure sensor, a level sensor, a flow-rate sensor, and a vibration sensor, not being limited thereto. Wireless sensors may be largely classified into elements and transmitters. Recently, a combination of an element and a transmitter has been generally used for wireless sensors.

According to an exemplary embodiment, the sensor signal transmission system 300 uses wireless power in the wireless sensor network system. The sensor signal transmission system 300 may be manufactured in the form of an equipment package in which a large number of sensors are installed in a narrow space. Examples of the equipment package include a compressor, a gas turbine, etc. which are installed in a high-pressure pipe. When the sensor signal transmission system 300 is manufactured in the form of an equipment package, the whole size of the sensor signal transmission system 300 is 20 m or less and thus power may be stably supplied via the wireless power supplies 330 and 332.

According to an exemplary embodiment, the sensor signal transmission system 300 may further include additional batteries in preparation for malfunction of the wireless power supplies 330 and 332, a problem occurring in power supply, or the like.

According to an exemplary embodiment, the sensor signal transmission system 300 may be also embodied as a self-organizing network system. In this case, all sensors, devices, nodes, etc. installed in the sensor signal transmission system 300 are not controlled by one centralized controller but may establish communication networks adaptively to a network situation in which nodes operate in a dispersive manner and may be self-maintained/repaired.

According to an exemplary embodiment, in the sensor signal transmission system 300, no additional wires are required to be installed between the sensors 301 to 305 and the controller 310. Thus, neither cables for installing the sensors 301 to 305 nor cable protection pipes, trays, a cable tray, etc. are required. Also, when an error occurs in a sensor, only the sensor may be exchanged with another sensor. In addition, when a new sensor is added, the gateway 320 may be reset after the new sensor is added. Accordingly, the sensor signal transmission system 300 may be installed and managed in an easy and simple manner.

The gateway 320 receives data collected via the sensors 301 to 305, transforms the data into a communication signal, and transmits the communication signal to the controller 310. Also, the sensors 301 to 305 installed in the compressor may receive power from the wireless power supplies 330 and 332 in a wireless manner.

According to an exemplary embodiment, in the sensor signal transmission system 300, priorities may be assigned to the sensors 301 to 305 to be installed in terms of arrangement. Among the sensors 301 to 305, priorities may be assigned to sensors (such as a control sensor, an alarm sensor, a shutdown sensor, etc.) that perform important functions for protecting the equipment package.

Figure 4:
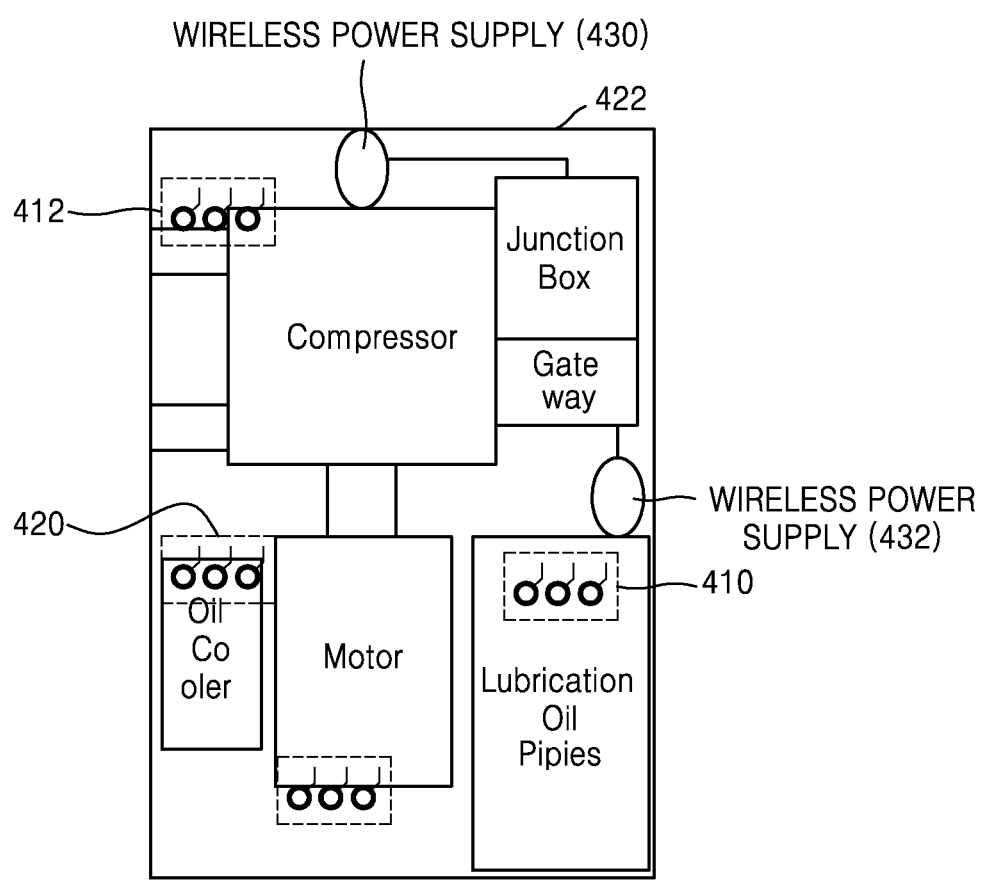
FIG. 4 illustrates a sensor signal transmission system in which priorities are assigned to wireless sensors such that a higher-priority sensor is disposed more adjacent to a wireless power supply unit, according to an exemplary embodiment.

FIG. 4 illustrates a sensor signal transmission system 422 in which priorities are assigned to wireless sensors 410, 412 and 420 such that a higher-priority sensor is disposed more adjacent to a wireless power supply, according to an exemplary embodiment. For example, the wireless sensor 410 attached on lubrication oil pipes has the first highest priority among the wireless sensors 410, 412 and 420. The wireless sensor 420 attached on an oil cooler has the second highest priority, and the wireless sensor 412 on a compressor has the lowest priority.

According to an exemplary embodiment, in the sensor signal transmission system, a higher priority is assigned to sensors having higher importance such that higher-priority sensors are disposed more adjacent to wireless power supplies 430 and 432.

Figure 5:
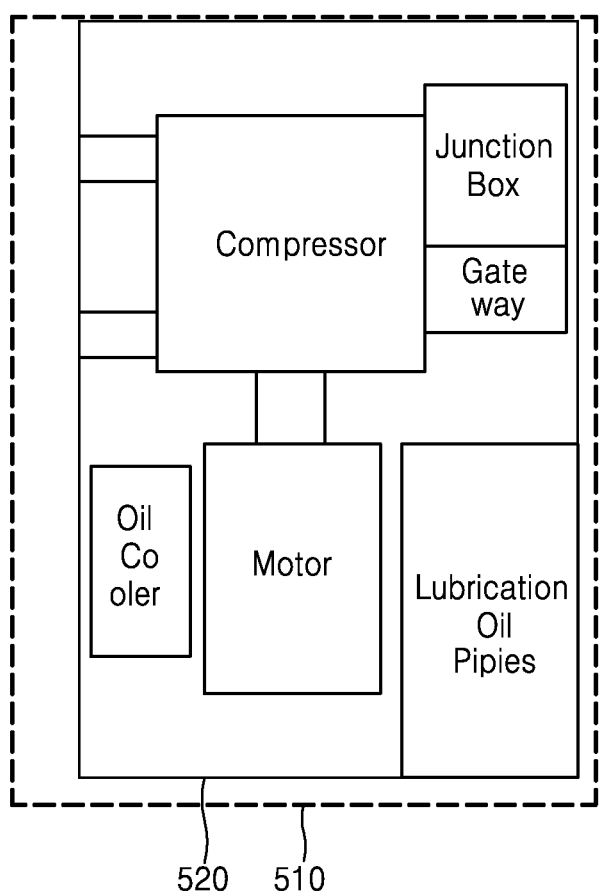
FIG. 5 illustrates a sensor signal transmission system using a wireless sensor network system and wireless power, according to an exemplary embodiment.

FIG. 5 illustrates a sensor signal transmission system 520 using a wireless sensor network system and wireless power, according to an exemplary embodiment.

The sensor signal transmission system 520 does not include a cable tray and the like required to install cable wires and is thus smaller than the a standard carry box 510, compared to the sensor signal transmission system 220 of FIG. 2.

As described above, according to the above exemplary embodiments, a sensor signal transmission system using a wireless sensor network system and wireless power require neither cables for installing sensors nor cable protection pipes, trays, cable trays, etc.

When an error occurs in a sensor, only the sensor need to be exchanged with another sensor. In addition, when a new sensor is added, the gateway 320 may be simply reset after the new sensor is added. Accordingly, the sensor signal transmission system 520 may be installed and managed in an easy and simple manner.

Although various features of the inventive concept have been described herein, the inventive concept should not be construed as being limited thereto. Features described in individual embodiments may be embodied in a single embodiment in combination. Otherwise, various features described in a single embodiment may be individually embodied in various embodiments or in appropriate sub-combination.

Although operations are illustrated in a specific order, the operations should not be construed as being limited to the specific order or a series of consecutive orders or all the operations should not be understood as being performed to obtain a desired result. In some environments, multitasking and parallel processing may be helpful. Furthermore, although various system components are classified in the above embodiments, the inventive concept is not limited thereto. In general, the program components and systems described above may be embodied as a single software product or multiple software products.

It should be understood that the exemplary embodiments described therein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. A sensor signal transmission system comprising:
   a plurality of wireless sensors disposed in an equipment package and configured to sense at least one type of information;
   a gateway configured to receive the at least one type of information sensed by the wireless sensors in a wireless manner, and convert the received information into at least one communication signal;
   a controller configured to control the equipment package by collecting the at least one communication signal input from the gateway; and
   at least one wireless power supply configured to supply power to the wireless sensors in a wireless manner,
   wherein priorities are assigned to the wireless sensors, respectively, and
   wherein a higher-priority sensor among the wireless sensors is disposed more adjacent to the at least one wireless power supply.

2. The system of claim 1, wherein the wireless sensors comprise a control sensor, an alarm sensor and a shutdown sensor which are disposed more adjacent to the at least one wireless power supply than the other sensors among the wireless sensors.

3. The system of claim 1, wherein the equipment package is a compressor, a gas turbine or a steam turbine.

4. The system of claim 1, wherein the controller is configured to control the wireless sensors in a wire or wireless manner based on the at least one communication signal.

5. The system of claim 4, wherein the controller is configured to transmit the at least one communication signal to a display device in a wire or wireless manner.

6. The system of claim 1, wherein the at least one type of information comprises information about at least one of ambient temperature, moisture and context of at least one device to which the wireless sensors are attached, respectively.

7. A method of transmitting a sensor signal from an equipment package in which a plurality of wireless sensors are installed, the method comprising:
   controlling a plurality of wireless sensors attached to at least one device, respectively, included in the equipment package to sense at least one type of information, and transmitting the sensed information to a gateway in a wireless manner;
   controlling the gateway to transform the sensed information into at least one communication signal;
   further controlling the wireless sensors based on the at least one communication signal;
   controlling at least one wireless power supply to supply power to the wireless sensors in a wireless manner; and
   assigning priorities to the wireless sensors, respectively,
   wherein a higher-priority wireless sensor among the wireless sensors is disposed more adjacent to the at least one wireless power supply.

8. The method of claim 7, wherein, in response to an error occurring to a wireless sensor among the wireless sensors or in response to attaching a new wireless sensor to a device included in the equipment package, the gateway is configured to change settings of the wireless sensor in which the error occurs or the new wireless sensor.

9. The method of claim 7, wherein the wireless sensors comprise a control sensor, an alarm sensor and a shutdown sensor which are disposed more adjacent to the at least one wireless power supply than the other sensors among the wireless sensors.

10. The method of claim 7, wherein the equipment package is a compressor, a gas turbine or a steam turbine.

11. The method of claim 7, wherein the at least one type of information comprises information about at least one of ambient temperature, moisture and context of at least one device to which the wireless sensors are attached, respectively.

* * * * *